United States Patent
Craddock et al.

[11] Patent Number: 6,005,851
[45] Date of Patent: Dec. 21, 1999

[54] ADAPTIVE CHANNEL CONTROL FOR DATA SERVICE DELIVERY

[75] Inventors: Arthur Julian Patterson Craddock, Greely; David Edward William Mercer, Stittsville; Eric Walter Parsons, Richmond, all of Canada

[73] Assignee: Nortel Networks Corporation, Montreal, Canada

[21] Appl. No.: 08/948,465

[22] Filed: Oct. 10, 1997

[51] Int. Cl.$^6$ .................................................. H04Q 7/00
[52] U.S. Cl. ........................................ 370/329; 370/468
[58] Field of Search .................................. 370/412, 395, 370/397, 399, 468, 474, 476, 389, 392, 420, 329

[56] References Cited

U.S. PATENT DOCUMENTS

| | | | |
|---|---|---|---|
| 5,463,629 | 10/1995 | Ko | 370/110.1 |
| 5,479,401 | 12/1995 | Bitz et al. | 370/397 |
| 5,502,723 | 3/1996 | Sanders | 370/352 |
| 5,572,523 | 11/1996 | Katsube et al. | 370/231 |
| 5,608,733 | 3/1997 | Vallée et al. | 370/394 |
| 5,619,647 | 3/1997 | Jardine | 395/200.01 |
| 5,629,933 | 5/1997 | Delp et al. | 370/411 |
| 5,765,032 | 6/1998 | Valizadeh | 370/235 |

*Primary Examiner*—Hassan Kizou
*Assistant Examiner*—Daniel Previl

[57] ABSTRACT

To transmit a stream of data packets over a physical channel, virtual channels for each data type (e.g. video, graphics, text) are created and mapped onto the physical channel based on a priority assigned to each virtual channel. Each virtual channel is also assigned a quality of services (QoS). A channel controller is allocated to each virtual channel. These channel controllers are connected to a dispatcher which receives the stream of data packets and distributes the data packets to the channel controllers based on the virtual channel to which the channel controllers are allocated. Should a channel controller encounter degradation in a transmission which reduces QoS below the specified values, a QoS parameter is adjusted. If this action does not achieve the specified QoS, the channel warns the dispatcher. The dispatcher, upon receipt of the warning, may, depending on the data type, reduce that channel controller's specified QoS or another channel's QoS. If the dispatcher takes no action, the controller degrades the data to achieve the necessary QoS.

23 Claims, 5 Drawing Sheets

ADAPTIVE CHANNEL CONTROL FOR DATA SERVICE DELIVERY

BACKGROUND OF THE INVENTION

This invention relates to a method and apparatus for transmitting a stream of data packets over one or more physical channels.

A physical channel is a transmission path as, for example, a fiber optic cable, a two-wire copper line, or a radio wave transmission path. A number of standards exist for the format and transport of data packets, for example, asynchronous transfer mode (ATM), transport control protocol/internet protocol (TCP/IP), point to point protocol (PPP), and serial line interface protocol (SLIP). With such standards, data packets are typically routed from a transmitter to a receiver by mapping the packets to a physical channel. Where the receiver does not acknowledge receipt of packets, some protocols (such as TCP/IP) assume this is due to congestion and the transmitter responds by repeatedly sending the data choosing ever smaller data windows (which are blocks of data) during each transmission.

U.S. Pat. No. 5,463,629 issued Oct. 31, 1995 to Ko concerns an ISDN line. In Ko, if a physical channel would be congested with a data stream (i.e., it would have insufficient bandwidth), the data stream is piped to a virtual channel. A mechanism is then provided to map the virtual channel to two physical channels.

U.S. Pat. No. 5,608,733 issued Mar. 4, 1997 to Vallee addresses congestion in an ATM network by sending cells (i.e., data packets) of a data stream over several physical links in a round robin fashion and then re-assembling the data stream in proper order at the receiver.

Congestion is only one reason for degradation of a communications link. Errors in the transmission, intermittent connectivity, and high channel latency are other potential problems.

This invention seeks to overcome drawbacks of known systems for transmitting a single data stream.

SUMMARY OF THE INVENTION

In accordance with the present invention, there is provided a method for transmitting a stream of data packets over a physical channel, comprising the steps of: for each data packet:

analyzing a packet header to determine a data type;
if there is a virtual channel associated with said data type, assigning said each data packet having said data type to said associated virtual channel; if there is no virtual channel associated with said data type, creating a virtual channel for said data type and assigning an intended quality of service (QoS) and priority to said created virtual channel based on said data type.

In one aspect, the method involves mapping a particular virtual channel to said physical channel based on a priority for said particular virtual channel; monitoring actual quality of service for each virtual channel; if an actual QoS of a given virtual channel falls below said intended QoS: assessing a criticality of said data type associated with said given virtual channel; and if said data type is assessed as critical, making an adjustment in respect of a virtual channel.

In another aspect, the method involves, based on a data type of a first virtual channel and a data type of a second virtual channel determining whether said first and second virtual channels should be synchronised; and mapping a particular virtual channel to said physical channel based on a priority for said particular virtual channel and on whether said particular virtual channel is to be synchronised with another virtual channel.

In accordance with another aspect of the present invention, there is provided a dispatcher comprising: a data input for receiving a stream of data packets; an analyzer for analyzing a header of each data packet received by said input to determine a data type; a virtual channel assigner for assigning said each data packet to a virtual channel based on said data type; and an intended quality of service and priority assigner for assigning an intended quality of service and priority to each virtual channel; a quality of service input for receiving an indication of an actual quality of service for each virtual channel; an assessor for, if an actual QoS of a given virtual channel falls below said intended QoS: assessing a criticality of said data type associated with said given virtual channel; and if said data type is assessed as critical, making an adjustment in respect of a virtual channel.

BRIEF DESCRIPTION OF THE DRAWINGS

In the figures which illustrate example embodiments of the subject invention.

DETAILED DESCRIPTION OF THE PREFERRED EMBODIMENTS

Figure 1:
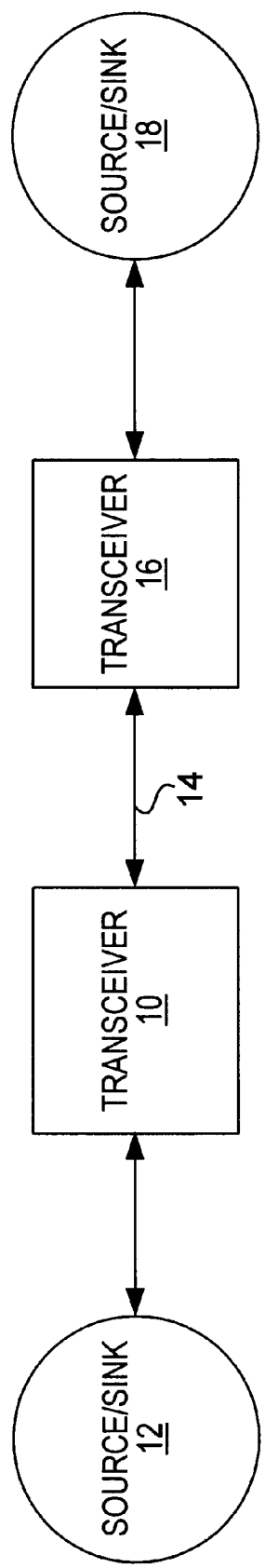
FIG. 1 is a block diagram of a communication system made in accordance with this invention.

Turning to FIG. 1, a communication system comprises a transceiver indicated generally at 10 connected between a data source/sink 12 of data packets and a physical channel 14. The other end of the physical channel terminates in a transceiver 16 which is connected to a data source/sink 18.

Figure 2:
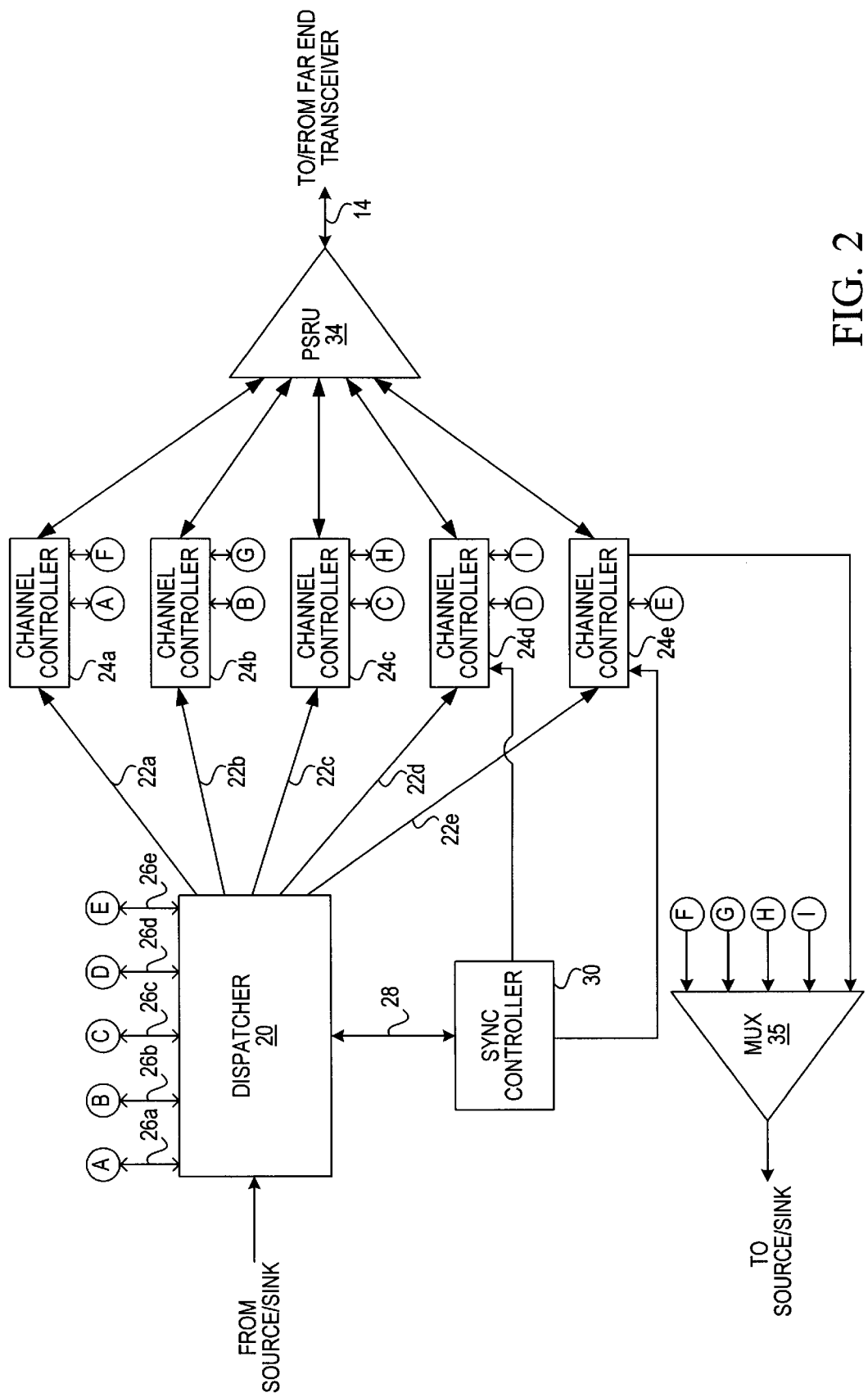
FIG. 2 is a detailed block diagram of a portion of FIG. 1.

Turning to FIG. 2, each transceiver comprises a dispatcher 20 which is input by data packets from a data source/sink and outputs on data lines 22a through 22e to channel controllers 24a through 24e, respectively. The dispatcher is connected for two-way communication with the channel controllers 24a through 24e on control lines 26a through 26e, respectively. As well, the dispatcher is connected for two-way communication with sync controller 30 on control line 28. The channel controllers are coupled for two-way data communication with packet send and receive unit (PSRU); each channel controller also has a data output line to multiplexer (MUX) 35 which, in turn, outputs to the data source/sink. The PSRU is connected to the physical channel 14. The sync controller 30 has a control output to channel controllers 24d and 24e.

Figure 3:
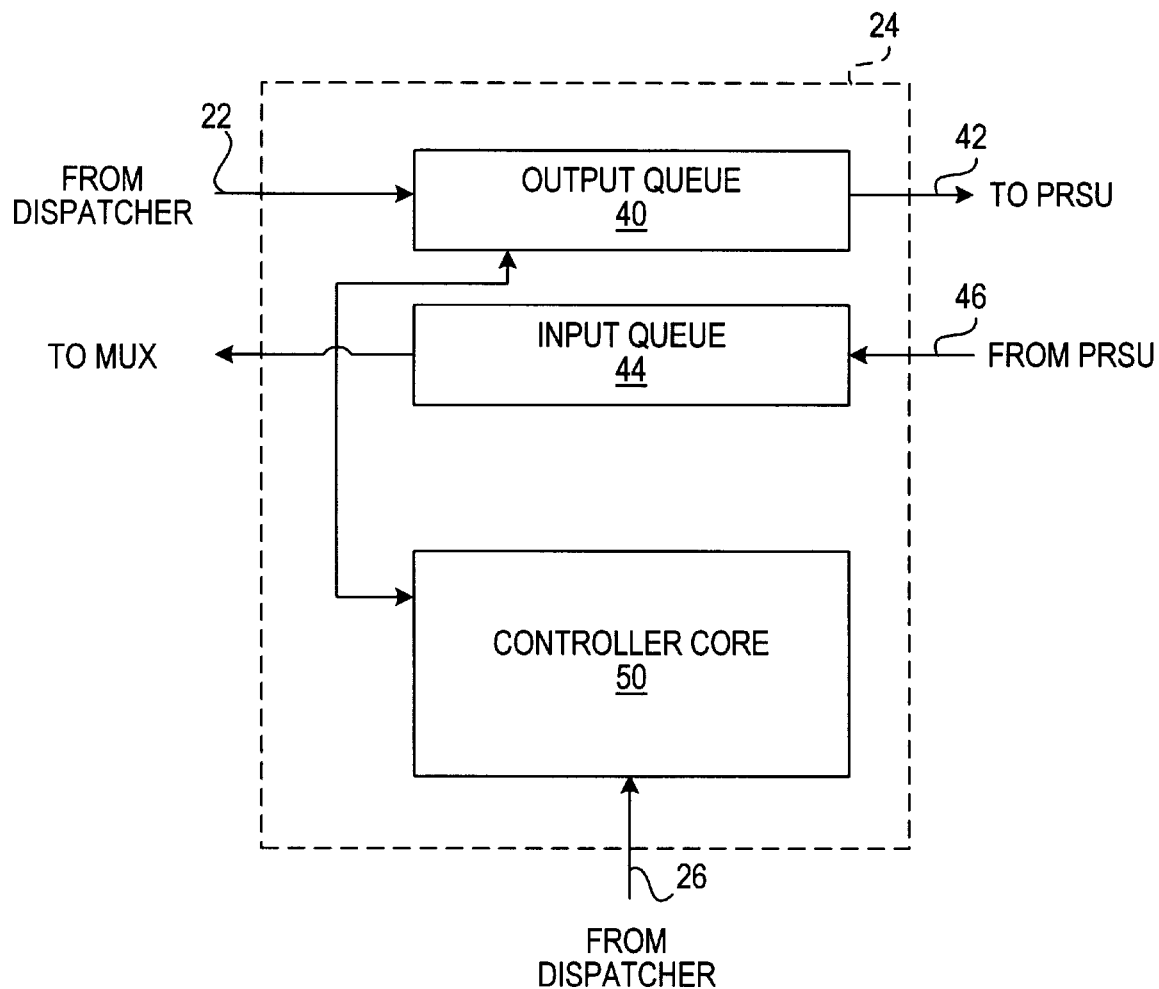
FIG. 3 is a detailed block diagram of a portion of FIG. 2, and FIGS. 4a and 4b comprise a program flow diagram for the dispatchers of FIG. 2.

FIG. 3 details a channel controller. Turning to FIG. 3, a channel controller 24 comprises an output queue 40 which is connected between the data line 22 from the dispatcher and an output line 42 to the PSRU. An input queue 44 is connected between an input line 46 from the PSRU and the MUX. A controller core 50 receives an input from the dispatcher control line 26 and is connected for two-way communication with the queues 40, 44.

The transceivers of this invention may operate independent of the architecture of the network which comprises the data source/sink 12, the physical channel 14, and the data source/sink 18.

Figure 4A:
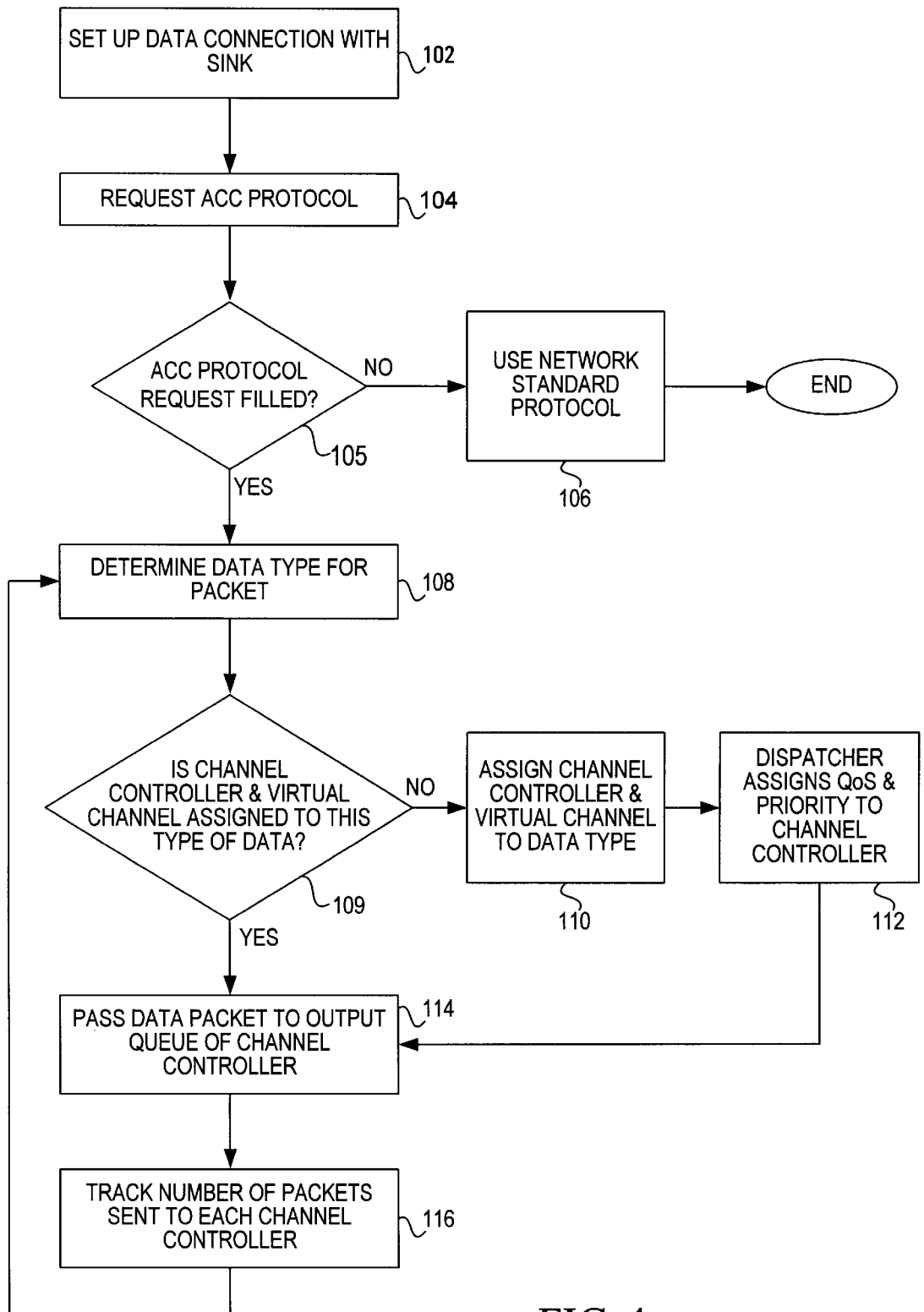
Figure 4B:
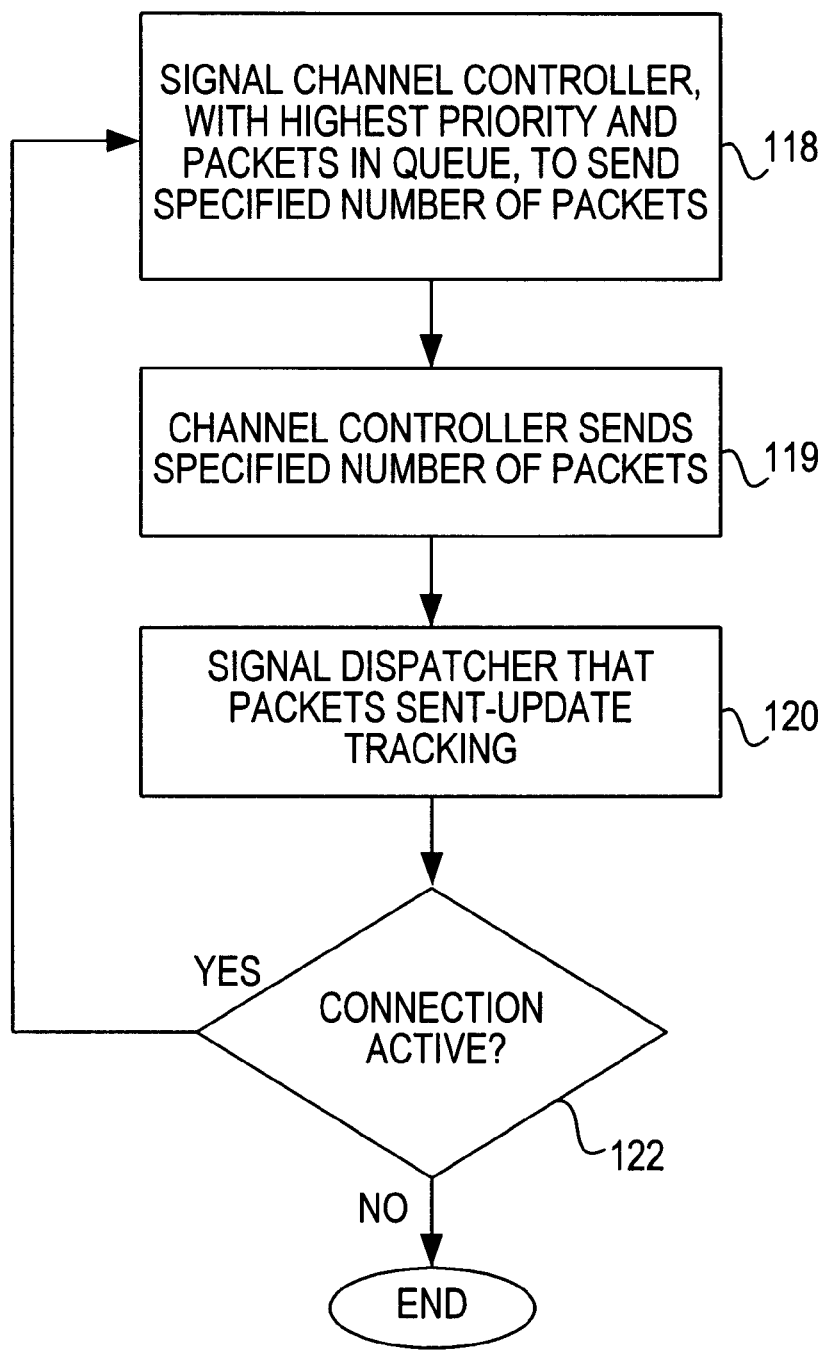

Operation of the communication system is described assuming that a near end data source/sink is acting as a data source transmitting data to a far end source/sink which is acting as a data sink. Turning to FIGS. 4a and 4b which comprise a flow diagram of the program control for the near end dispatcher 20, initially, the dispatcher allows the near end data source to set up a data connection with the sink over physical channel 14 using any existing protocol for sending packets from a source to an endpoint, such as PPP (block 102). Once the connection has been established, the near end dispatcher 20 requests that communications be handled in accordance with the adaptive channel control (ACC) protocol of this invention (block 104). If the dispatcher receives no reply to this request, it is assumed that the far end does not support ACC protocol (block 105) and data transport proceeds utilising the protocol which is standard for the network (block 106). If, on the other hand, a far end transceiver responds positively (or if the dispatcher receives a request for ACC protocol handling from the far end transceiver in advance of sending a request for such handling to the far end transceiver), then the near end dispatcher begins analyzing the header of each incoming data packet to determine the data type for the packet (block 108).

By way of example, the network may be the internet and the source 12 a computer which is sending an html page to another computer. The html page may consist of text, graphics, and video. If the first data packet is, say, a graphics data packet, the dispatcher will assign the first packet to a first virtual channel and will allocate one of the channel controllers to that virtual channel (blocks 109 and 110). At the same time, the dispatcher assigns an intended quality of service (QoS) and consequent priority to the first virtual channel and passes this to the controller core 50 on control line 26 (block 112). Thereafter, the dispatcher passes the first packet and subsequently received graphics-type packets to the allocated channel controller where they enter the output queue 40 of the channel controller (block 114).

When the dispatcher first encounters a text-type packet, it assigns the packet to a second virtual channel and allocates another channel controller to this second virtual channel (blocks 109 and 110). Again, an intended quality of service and consequent priority are assigned and passed to the chosen channel controller (block 112) and, subsequently, all text-type packets are passed by the dispatcher to the output queue of the chosen controller (block 114). The same sequence of events occurs when the dispatcher first encounters a packet with video data. However, in this instance, the dispatcher may consider video data to be of more than one type. For example, high frequency video data may be considered of one type, mid frequency video data, data of another type and low frequency video data, data of a third type. In such case, the dispatcher will assign three virtual channels to the video data, one for each type of such video data.

Optionally, the dispatcher may re-packetise incoming packets either to create a series of smaller packets (each with header information that allows re-assembly of the incoming packet at the far end) or to format the incoming packet to a different protocol prior to passing the packets to the allocated channel controller.

The assigned quality of service may comprise a number of parameters which are passed to the controller core. These parameters may include a maximum tolerable data error rate, a throughput range (i.e., a range for the rate at which data packets are sent to the physical channel), a range for the channel latency (i.e., a range for the time taken for a data packet to propagate through to the far end transceiver and an acknowledgement of its reception to be received by the near end transceiver), and a maximum number of packets to be queued up for the virtual channel. This quality of service may be negotiated between source and sink at the beginning of the communication session, with the dispatcher receiving the results of the negotiation or it may be a quality guaranteed by the source and transmitted to the dispatcher. As an example, the sink may request a low throughput to ensure low channel latency for certain communications as, for example, where a modem at the sink has a large buffer. The quality of service is indicative of a priority for a virtual channel and, therefore, the dispatcher may use an algorithm to calculate a suitable priority after a quality of service is determined.

The dispatcher tracks the number of data packets it sends to each channel controller (block 116). In parallel with the process of passing data packets to channel controllers, the dispatcher signals the channel controller allocated to the highest priority virtual channel which the dispatcher knows to have packets at its output queue to send a specified number of packets (block 118). This channel controller responds by transmitting this number of packets from the head of its output queue to the PSRU 34 which, in turn, places these packets on physical channel 14. In this way, the virtual channel allocated to the channel controller is mapped to the physical channel. When the specified number of packets has been sent (block 119), the channel controller signals the dispatcher so that the dispatcher may keep track of packets remaining in the output queue for that channel controller (block 120); in this way, the dispatcher tracks the state of the output queues. The dispatcher then signals the channel controller with waiting packets which is allocated to the next highest priority virtual channel to begin transmitting. This procedure continues until the data connection between the source and sink is torn down (block 122).

When a virtual channel is mapped to the physical link, the associated channel controller initially sends data packets at the maximum specified throughput. It then receives feedback from the far end transceiver—on line 46 via its input queue 44—indicating the error rate and channel latency. Whenever the feedback parameters are outside of the specified acceptable values, throughput is adjusted accordingly. If no adjustment of throughput achieves the intended quality of service, the channel controller signals the dispatcher with a warning and then (after a short delay to allow the dispatcher to respond) proceeds to degrade the data as necessary to achieve the required quality of service. This degradation may take one of two forms. Firstly, provided the error rate is less than the maximum specified, the channel controller may use a compression algorithm to compress the data packets in its output queue and send information to the far end transceiver which will allow it to decompress the data. The compression could increase the error rate, but it will increase the throughput. Alternatively, the channel controller may simply dump data packets.

When a channel controller is not sending packets, it will still monitor quality of service. For example, as the time it is not transmitting increases, the throughput for the virtual channel with which it is associated drops. If the quality of service drops outside specified parameters, the controller will issue a warning to the dispatcher.

When the dispatcher receives a warning from a controller, it has the option of reducing the quality of service constraints for the channel controller issuing the warning in order that such controller does not degrade data. This would be an appropriate response whenever the channel controller is allocated to a virtual channel having a critical data-type. In such instance, the dispatcher may request another channel controller to degrade its data or reduce its quality of service in order to avoid congestion. By way of example, if a video signal is allocated to three virtual channels, with low, mid, and high frequency data types and the channel controller associated with the mid or low frequency data-type issued a warning, the dispatcher may respond by requesting the issuing channel controller not to degrade data and with a request to the controller for the high frequency data-type to degrade data. This will minimize the loss of user perceptible data.

In some instances, it is necessary for two virtual channels to be in synchronism. This is most typically the case where one virtual channel contains video data and the other virtual channel contains associated audio data. Sync controller 30 is provided to accommodate this possibility. Whenever there are virtual channels to be synchronised, the dispatcher 20 sets up a connection between the sync controller and the channel controllers allocated to such virtual channels. In FIG. 1, this is illustrated as a connection between the sync controller and channel controllers 24d and 24e. If one of these two channel controllers gets out of synchronism with the other, the sync controller will send a control signal causing the appropriate one of the channel controllers to slow its data sending. Alternatively, the sync controller may signal the dispatcher with an "out-of-sync" indication and an identifier of the slower channel thereby allowing the dispatcher to dynamically change the QoS (and priority) of any channel in order to rectify the situation.

As aforenoted, the dispatcher may dynamically change the quality of service parameters for any virtual channel. A change in the QoS for a given virtual channel will result in the dispatcher also dynamically changing the priority for the virtual channel.

The priority parameter for virtual channels is particularly important in situations where the physical link has a stricture. For example, the physical link may be capable of a high data rate at the source end, but only a much lower data rate at the sink (as, for example, where the data rate is constrained at the sink by a slow modem).

The PSRU of the far end transceiver reads the header of each incoming packet for a data type in order to pass the packet to a channel controller for that data type: in this regard, it is noted that the far end PSRU allots a channel controller to that data type when receiving a first data packet of a given data type. The far end channel controllers re-packetise incoming packets as necessary and then pass the incoming packets to the far end MUX from whence they move to the data sink as a re-assembled data stream.

By directing packets of each data type to individual far end channel controllers, a far end channel controller for a given virtual channel may pass a receipt acknowledgement back to a near end channel controller for the corresponding virtual channel thereby allowing the near end channel controller to determine a channel latency QoS parameter.

Although not shown, the physical channel 14 itself may have parameter sensors allowing it to feedback parameter information to the near end channel controller of the mapped virtual channel. This would enhance control of the quality of service by the channel controller. However, the form of such interaction with the hardware of the network will generally depend on the hardware architecture and so this modification is not preferred where it is desired to have the transceivers operate in a manner which is independent of network architecture.

When it receives data, the sink will normally send an acknowledgement signal intended for the source. This acknowledgement signal propagates through the far end transceiver and enters the input queue of a near end channel controller. The signal is passed by this channel controller through the MUX 35 directly to the data source.

As will be appreciated by those skilled in the art, a data packet may be considered to have one header or several headers, as the packet includes packet information at various layers, such as the link layer and application layer. The term "packet header" is used herein as indicative of all header information in the packet.

Rather than the channel controllers being uniform as described, these controllers could each be optimized to handle certain types of data expected on the network, in which case the dispatcher would only allocate such specialised channel controllers to handle packets having the data type for which it was optimized to handle.

Of course, the number of channel controllers will depend upon the maximum possible number of virtual channels. Alternatively, the channel controllers could be implemented in software such that as many channel controllers as were required could be created.

A channel controller could be implemented as a fuzzy logic controller.

While the exemplary embodiment of FIG. 1 has one physical channel, the principles of this invention would apply equally where the virtual channels could be mapped to two or more physical channels. Further, while a near end data source has been described as sending a single stream of data, there may be multiple data streams entering the near end dispatcher. In such instance, each packet header will include an indication of the source stream allowing proper routing of the packet at the far end.

Other modifications will be apparent to those skilled in the art and, therefore, the invention is defined in the claims.

What is claimed is:

1. A method for transmitting a stream of data packets over a physical channel, comprising:

for each data packet:
analyzing a packet header to determine a data type;
if there is a virtual channel associated with said data type, assigning said each data packet having said data type to said associated virtual channel;
if there is no virtual channel associated with said data type, creating a virtual channel for said data type and assigning an intended quality of service (QoS) and priority to said created virtual channel based on said data type;

mapping a particular virtual channel to said physical channel based on a priority for said particular virtual channel;

monitoring actual quality of service for each virtual channel;

if an actual QoS of a given virtual channel falls below said intended QoS;
assessing a criticality of said data type associated with said given virtual channel; and
if said data type is assessed as critical, making an adjustment in respect of a virtual channel.

2. The method of claim 1 including the step of re-packetising said each data packet into one or more re-packetised packets and wherein the step of queuing said each data packet on said virtual channel comprises queuing said one or more re-packetised packets on said virtual channel.

3. The method of claim 1 wherein said intended quality of service comprises at least one of a specified throughput range, a specified maximum error rate, a specified latency range, and a specified maximum number of packets queued up for said each virtual channel.

4. The method of claim 1 including the step of, for each virtual channel, tracking a number of data packets queued on said each virtual channel.

5. The method of claim 1 wherein said making an adjustment in respect of a virtual channel comprises relaxing a constraint of said intended QoS for said given virtual channel.

6. The method of claim 1 wherein said making an adjustment in respect of a virtual channel comprises relaxing a constraint of said intended QoS for a virtual channel other than said given virtual channel.

7. The method of claim 1 wherein said making an adjustment in respect of a virtual channel comprises degrading data associated with a virtual channel other than said given virtual channel.

8. The method of claim 1 wherein said degrading data comprises one of compressing data packets or dropping data packets.

9. A dispatcher comprising:
   a data input for receiving a stream of data packets;
   an analyzer for analyzing a header of each data packet received by said input to determine a data type;
   a virtual channel assigner for assigning said each data packet to a virtual channel based on said data type;
   an intended quality of service and priority assigner for assigning an intended quality of service and priority to each virtual channel;
   a quality of service input for receiving an indication of an actual quality of service for each virtual channel;
   an assessor for, if an actual QoS of a given virtual channel falls below said intended QoS:
      assessing a criticality of said data type associated with said given virtual channel; and
      if said data type is assessed as critical, making an adjustment in respect of a virtual channel.

10. The dispatcher of claim 9 including a mapper for mapping a particular virtual channel to said physical channel based on said priority assigned to said particular virtual channel.

11. The dispatcher of claim 10 including a re-packetiser for re-packetising data packets and wherein said a virtual channel assigner is responsive to said re-packetiser.

12. The dispatcher of claim 9 wherein said assessor, in making an adjustment in respect of a virtual channel, relaxes a constraint of said intended QoS for said given virtual channel.

13. The dispatcher of claim 9 wherein said assessor, in making an adjustment in respect of a virtual channel, relaxes a constraint of said intended QoS for a virtual channel other than said given virtual channel.

14. The dispatcher of claim 9 wherein said assessor, in making an adjustment in respect of a virtual channel, prompts degradation of data on a virtual channel other than said given virtual channel.

15. A transceiver for transmitting a stream of data packets over a physical channel comprising:
   a plurality of virtual channels;
   a dispatcher comprising:
      a data input for receiving a stream of data packets;
      an analyzer for analyzing a header of each data packet received by said input to determine a data type;
      a virtual channel assigner for assigning said each data packet to a virtual channel based on said data type; and
      an intended quality of service (QoS) and priority assigner for assigning an intended quality of service and priority to a given virtual channel;
      a quality of service input for receiving an indication of an actual quality of service for each virtual channel;
      an assessor for, if an actual QoS of a given virtual channel falls below said intended QoS;
         assessing a criticality of said data type associated with said given virtual channel; and
         if said data type is assessed as critical, making an adjustment in respect of a virtual channel; and
   for each virtual channel, a channel controller for receiving an intended quality of service indication from said intended quality of service and priority assigner of said dispatcher and for monitoring quality of service constraints and for degrading data, where necessary, in order to try to maintain said intended quality of service.

16. The transceiver of claim 15 wherein said channel controller is also for degrading data where actual quality of service falls below intended quality of service.

17. The transceiver of claim 16 including a re-packetiser for re-packetising data packets and wherein said a virtual channel assigner is responsive to said re-packetiser.

18. The transceiver of claim 15 wherein said assessor, in making an adjustment in respect of a virtual channel, relaxes a constraint of said intended QoS for said given virtual channel so that said channel controller for said given virtual channel does not degrade data.

19. The transceiver of claim 15 wherein said assessor, in making an adjustment in respect of a virtual channel, relaxes a constraint of said intended QoS for a virtual channel other than said given virtual channel so that said channel controller for said given virtual channel does not degrade data.

20. The transceiver of claim 15 wherein said assessor, in making an adjustment in respect of a virtual channel, prompts a channel controller for a virtual channel other than said given virtual channel to degrade data so that said channel controller for said given virtual channel does not degrade data.

21. The transceiver of claim 15 wherein a channel controller, when prompted to degrade data, compresses data packets or drops data packets.

22. A method for transmitting a stream of data packets over a physical channel, comprising:
   for each data packet;
      analyzing a packet header to determine a data type;
      if there is a virtual channel associated with said data type, assigning said each data packet having said data type to said associated virtual channel;
      if there is no virtual channel associated with said data type, creating a virtual channel for said data type and assigning an intended priority to said created virtual channel based on said data type;
   based on a data type of a first virtual channel and a data type of a second virtual channel determining whether said first and second virtual channels should be synchronised; and
   mapping a particular virtual channel to said physical channel based on a priority for said particular virtual channel and on whether said particular virtual channel is to be synchronised with another virtual channel.

23. The method of claim 22 wherein, if said first and second virtual channels should be synchronised, said mapping comprises reducing a priority for a virtual channel if said first and second virtual channels get out of synchronism.

* * * * *